R. M. MITCHELL.
GRANARY.
No. 82,339. Patented Sept. 22, 1868.
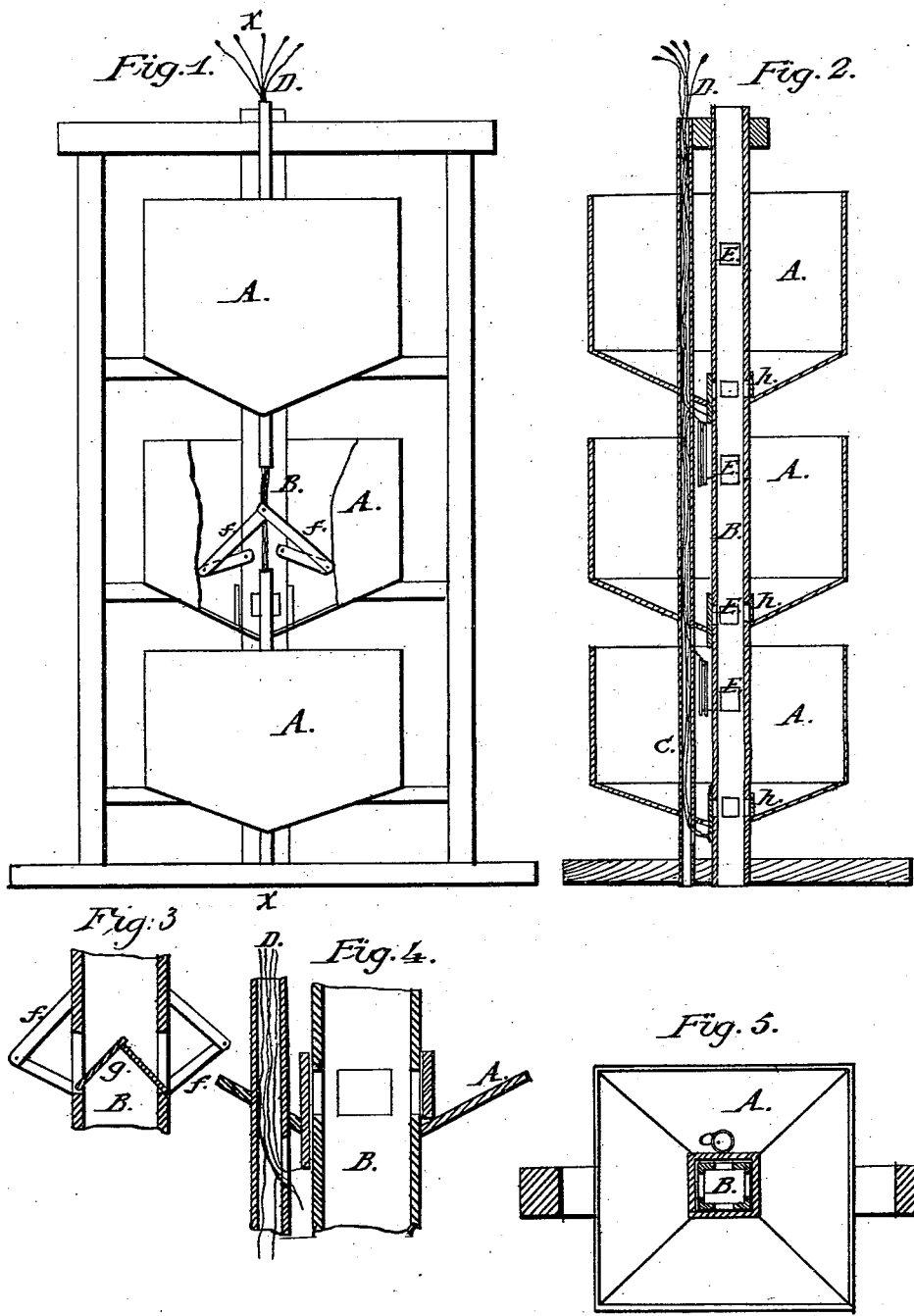

United States Patent Office.

R. M. MITCHELL, OF FORT ATKINSON, WISCONSIN.

Letters Patent No. 82,339, dated September 22, 1868.

---

IMPROVEMENT IN GRAIN-STORER.

---

The Schedule referred to in these Letters Patent and making part of the same.

---

TO ALL WHOM IT MAY CONCERN:

Be it known that I, R. M. MITCHELL, of Fort Atkinson, in the county of Jefferson, and State of Wisconsin, have invented a new and useful Improvement in the Construction and Arrangement of Grain-Bins; and I do hereby declare that the following is a full, clear, and exact description thereof, which will enable those skilled in the art to make and use the same, reference being had to the accompanying drawings, forming part of this specification.

This invention relates to a new and useful improvement in the method of storing grain in storehouses, where the grain is elevated and delivered into bins, as is customary.

And the invention consists in such a construction and arrangement of the bins in the storehouses, that the separate qualities or kinds of grain, and a separate car-load, if desired, or crops of grain may be kept separate from the rest of the grain stored, and be delivered from the storehouse without being mixed with or disturbing the grain in the other bins, and whereby suitable ventilation is provided.

Figure 1 represents an elevation of grain-bins, arranged according to my invention, one above the other, the side of one of the bins being broken away in order to show the interior arrangement.

Figure 2 is a vertical section, showing the interior of the grain-tube, and also the valve-openings into it, and the arrangement of the valve-cords.

Figure 3 is a detached view of the interior valve-arrangement in the grain-tube.

Figure 4 is another detached view, showing the bottom of the bin by which the grain-tube is surrounded.

Figure 5 is a detached top view of a bin.

Similar letters of reference indicate corresponding parts.

As grain is now stored, in large storehouses, it is placed in large bins, containing thousands of bushels, so that it is impossible to keep the qualities or crops separate from each other, and where great damage is sustained from the heating of the grain, a result which is inseparable from the system of storage now in use.

In my arrangement, any single car-load of grain may be stored and withdrawn entirely separate from any other grain in the storehouse, while each bin is properly ventilated, and all danger from heating is avoided.

For the purpose of explaining and illustrating this method of storing grain, the drawing represents the bins somewhat out of their intended position. It is intended that they shall be placed near together, representing a vertical column around a central grain-tube; that this column of bins may extend through from base to attic of the storehouse, and consist of as many bins as it may be convenient to have; and that as many of these columns of bins may be placed in the storehouse, and stand as near together as it may be convenient to place them, thus forming horizontal tiers of bins throughout the storehouse, which bins may be used entirely separate from and independent of each other.

The bins of each column are connected with their own central grain-tube, and thereby with the elevator, by valves or by slides, or in any other suitable or convenient manner.

Referring to the drawings—

A represents the bins, three being shown, forming a column or a portion of the column before mentioned.

B is the central grain-tube.

C is a tube, which contains the cords by which the valves for each bin are operated. This tube is designed to extend through the column, as represented.

D represents the cluster of cords at the top end of the tube C, each cord being labelled or marked so as to denote the bin to which it belongs, and the particular valve with which it is connected.

The receiving-valves are adapted to be fitted in orifices marked E, in the side of the tube B.

F indicates the discharge-orifices.

The orifices for admitting the grain into the bin, as well as those for its discharge, are provided with valves or slides, or with both, so arranged and operated that the grain may be delivered into any one particular bin contained in the storehouse, and discharged therefrom, as before stated.

The valves or slides are provided with arms or levers, to which the cords are connected, as seen in the drawing at $f$.

$g$ represents the receiving-valve, either single or double, and arranged so that the grain, descending through the central grain-tube, shall be effectually stopped and delivered into the bin to which it belongs. When the bin is filled, or the desired quantity has been delivered into it, this valve is closed.

$h$ is the discharge-valve or slide.

It will thus be seen that the bins of each of the columns are filled, and the grain discharged therefrom through a single tube, and we repeat that the valves or slides, or both valves and slides, are so arranged and capable of such an adjustment that any single bin in a column may be either filled or discharged through the tube independently of the others.

There will of course be sufficient space left between the columns and tiers of bins to allow the elevator to be properly connected with the several tubes.

By this arrangement the different qualities or crops of grain, or quantities as small as a single car-load, may not only be kept separate from the rest of the grain, but the grain will be so well ventilated that all danger of heating and consequently injuring the grain will be avoided.

Proper ventilation in a grain-storehouse is a consideration of paramount importance. Where it is stored in large masses, as is now done, heating, sprouting, and spoiling, to a greater or less degree, are inevitable results.

I do not wish to confine myself to the construction and arrangement of the valves and the means for operating them, as above set forth, as they may be varied in practice without departing from the general principle of my invention; but having thus described my invention,

I claim as new, and desire to secure by Letters Patent—

1. The arrangement of the bins A in a vertical column, said bins being connected by means of a tube, B, provided with receiving and discharge-orifices E F respectively, substantially as described for the purpose specified.

2. The tube B, passing through the series of bins A, and provided with receiving and discharge-orifices, communicating with each bin, said orifices being provided with valves which are adapted to be operated by means of cords D, or their equivalents, in the manner and for the purpose substantially as herein set forth.

R. M. MITCHELL.

Witnesses:
WM. F. MCNAMARA,
ALEX. F. ROBERTS.